(12) United States Patent
Bhatnagar et al.

(10) Patent No.: US 10,615,867 B1
(45) Date of Patent: Apr. 7, 2020

(54) OPTICAL AMPLIFIER SIGNALING SYSTEMS AND METHODS FOR SHUTOFF COORDINATION AND TOPOLOGY DISCOVERY

(71) Applicant: Ciena Corporation, Hanover, MD (US)

(72) Inventors: Vipul Bhatnagar, Kensington, MD (US); Paul Chedore, Ottawa (CA)

(73) Assignee: Ciena Corporation, Hanover, MD (US)

(*) Notice: Subject to any disclaimer, the term of this patent is extended or adjusted under 35 U.S.C. 154(b) by 0 days.

(21) Appl. No.: 16/388,299

(22) Filed: Apr. 18, 2019

(51) Int. Cl.
| | |
|---|---|
| *H04B 10/00* | (2013.01) |
| *H04B 10/071* | (2013.01) |
| *H04B 10/079* | (2013.01) |
| *H04B 10/2507* | (2013.01) |
| *H04B 10/27* | (2013.01) |
| *G01M 11/00* | (2006.01) |
| *H04J 14/02* | (2006.01) |
| *H04J 14/00* | (2006.01) |

(52) U.S. Cl.
CPC ........... *H04B 10/071* (2013.01); *G01M 11/33* (2013.01); *H04B 10/07955* (2013.01); *H04B 10/25073* (2013.01); *H04B 10/27* (2013.01); *H04J 14/0213* (2013.01)

(58) Field of Classification Search
CPC ..................... H04B 10/29; H04B 10/03032; H04B 10/035; H04B 10/038
See application file for complete search history.

(56) References Cited

U.S. PATENT DOCUMENTS

| | | | |
|---|---|---|---|
| 6,765,659 B1 | 7/2004 | Bhatnagar et al. | |
| 7,054,562 B1 | 5/2006 | Balakrishnan et al. | |
| 10,063,313 B1 | 8/2018 | Al Sayeed et al. | |
| 10,122,586 B2 | 11/2018 | Htay et al. | |
| 10,250,324 B1 | 4/2019 | Chedore et al. | |
| 2002/0165962 A1* | 11/2002 | Alvarez | G06F 8/65 709/226 |
| 2009/0324214 A1* | 12/2009 | Li | H04B 10/075 398/1 |
| 2014/0126912 A1 | 5/2014 | Bhatnagar | |
| 2017/0346591 A1 | 11/2017 | Chedore et al. | |

\* cited by examiner

*Primary Examiner* — Daniel G Dobson
(74) *Attorney, Agent, or Firm* — Clements Bernard Walker; Christopher L. Bernard; Lawrence A. Baratta, Jr.

(57) ABSTRACT

A network element includes a transmitting amplifier configured to transmit to a first optical fiber, wherein the transmitting amplifier has a pump laser; and an optical monitor connected to a second optical fiber and configured to detect a portion of optical power thereon; wherein the pump laser is modulated to convey a signal to a second optical monitor in a second network element connected to the first optical fiber, when the transmitting amplifier is one of in a safety mode and has no input.

16 Claims, 9 Drawing Sheets

OPTICAL AMPLIFIER SIGNALING SYSTEMS AND METHODS FOR SHUTOFF COORDINATION AND TOPOLOGY DISCOVERY

FIELD OF THE DISCLOSURE

The present disclosure generally relates to optical amplifiers in fiber optic systems. More particularly, the present disclosure relates to optical amplifier signaling systems and methods for shutoff coordination and topology discovery in an optical network that does not have a service channel available between optical amplifiers.

BACKGROUND OF THE DISCLOSURE

Optical networks (i.e., fiber optic systems) utilize optical amplifiers such as Erbium Doped Fiber Amplifiers (EDFAs) in various locations including intermediate line amplifiers, receiving amplifiers (also referred to a pre amplifiers), transmitting amplifiers (also referred to a post amplifiers or booster amplifiers), add/drop amplifiers (on the add/drop side of an Optical Add/Drop Multiplexer (OADM), etc. On the line side in an optical section (between an OADM and a second OADM), there can be a transmitting amplifier, various intermediate line amplifiers, and a receiving amplifier. The conventional approach for communication and coordination between these devices is via an Optical Service Channel (OSC). For example, eye safety regulations or standards is one aspect that requires coordination between optical amplifiers. The eye safety levels are defined in relevant standards (e.g., ITU G.664, IEC60825-2, etc.) and require that optical amplifiers limit their output powers to an eye-safe level when transmitting into a broken/unterminated fiber. Power levels in standard Single Mode Fiber (SMF) in the 1550 nm window should be <10 mW or <136 mW to comply with Hazard 1 or 1M levels, respectively. In addition to complying with the eye safety requirements, it is operationally advantageous for the amplifiers to automatically resume operation once the fiber break is repaired. There are scenarios where no OSC is deployed on a fiber pair, such as in the case where an optical system utilizes multiple fiber pairs, i.e., only one OSC is needed for multiple fiber pairs. There is a need for shutoff coordination between optical amplifiers where there is no OSC.

On the add/drop of an OADM, there can be optical amplifiers prior to channel multiplexer/demultiplexers, such as in Colorless, Directionless, and Contentionless (CDC) architectures. There is typically no OSC on the local add/drop side for communication and coordination as the OSC is between nodes, not internal to a node. There is a need to determine/verify connectivity (topology). There is also a need to determine/verify connectivity on the line side as well, such as in the case of multiple fiber pairs.

Accordingly, it would be advantageous to have a system level framework for optical amplifier communication in the absence of an underlying service channel.

BRIEF SUMMARY OF THE DISCLOSURE

In an embodiment, a network element includes a transmitting amplifier configured to transmit to a first optical fiber, wherein the transmitting amplifier has a pump laser; and an optical monitor connected to a second optical fiber and configured to detect a portion of optical power thereon; wherein the pump laser is modulated to convey a signal to a second optical monitor in a second network element connected to the first optical fiber, when the transmitting amplifier is one of in a safety mode and has no input. The optical monitor can be configured to receive a second signal from a second transmitting amplifier in the second network element. The signal can include Amplified Stimulated Emission (ASE) that is generated by modulating the pump laser to change output power of the transmitting amplifier as a function of time. The transmitting amplifier can be in the safety mode, and wherein an input to the transmitting amplifier can be blocked via one of a Variable Optical Attenuator and a switch, such that an output is based on the modulated pump laser. The transmitting amplifier can be in the safety mode and is a multi-stage amplifier, and wherein an input to the transmitting amplifier can be blocked via no pumping of a first stage of the multi-stage amplifier, such that an output is based on the modulated pump laser. The signal can be one of a plurality of patterns to indicate a state relative to amplifier shutdown due to eye safety. The signal can be a unique identifier used to verify connectivity. There can be no operational Optical Service Channel (OSC) on the first optical fiber and the second optical fiber.

In another embodiment, a method includes transmitting a signal via a transmitting amplifier connected to an optical fiber based on modulating a pump laser in the transmitting amplifier, when the transmitting amplifier is one of in a safety mode and has no input; receiving the signal via an optical monitor connected to the optical fiber; and determining a state of one or more of the transmitting amplifier and the optical fiber based on the signal. The signal can include Amplified Stimulated Emission (ASE) that is generated by modulating the pump laser to change output power of the corresponding transmitting amplifier as a function of time. The transmitting amplifier can be in the safety mode, and wherein an input to the transmitting amplifier can be blocked via one of a Variable Optical Attenuator and a switch, such that an output is based on the modulated pump laser. The transmitting amplifier can be in the safety mode and is a multi-stage amplifier, and wherein an input to the transmitting amplifier can be blocked via no pumping of a first stage of the multi-stage amplifier, such that an output is based on the modulated pump laser. The signal can be one of a plurality of patterns to indicate the state relative to amplifier shutdown due to eye safety. The signal can be a unique identifier used to verify connectivity. There can be no operational Optical Service Channel (OSC) on the first optical fiber and the second optical fiber.

In a further embodiment, an optical system includes a transmitting amplifier configured to transmit to an optical fiber, wherein the transmitting amplifier has a pump laser; and an optical monitor connected to the optical fiber and configured to detect a portion of optical power thereon; wherein the pump laser is modulated to convey a signal to the optical monitor connected to the optical fiber, when the transmitting amplifier is one of in a safety mode and has no input. The signal can include Amplified Stimulated Emission (ASE) that is generated by modulating the pump laser to change output power of the transmitting amplifier as a function of time. The transmitting amplifier can be in a first module of an Optical Add/Drop Multiplexer (OADM) and the optical monitor is in a second module of the OADM. The signal can be a unique identifier used to verify connectivity. The unique identifier can identify one of a shelf, slot, and chassis.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

The present disclosure relates to optical amplifier signaling systems and methods in an optical network. These signaling systems and methods can be used for shutoff coordination, topology discovery, connectivity verification, etc. in an optical network. Also, these signaling systems and methods replace conventional approaches utilizing Optical Service Channels (OSCs). The signaling systems and methods utilize amplifiers and power monitors as data transmitters and receivers, respectively, for monitoring fiber continuity and exchanging information. The signaling systems and methods include a protocol that allows a network element to distinguish continuity states of a fiber pair, independent of channel loading, duplex, simplex, and node. The signaling systems and methods include a system level framework where an amplifier has its pump modulated to transmit a signal to an adjacent device that is a power monitor configured to detect the power from the modulated pump. Based on the conveyed state of the link status, various consequential actions can be taken.

Optical Amplifier Signaling Framework

Figure 1:
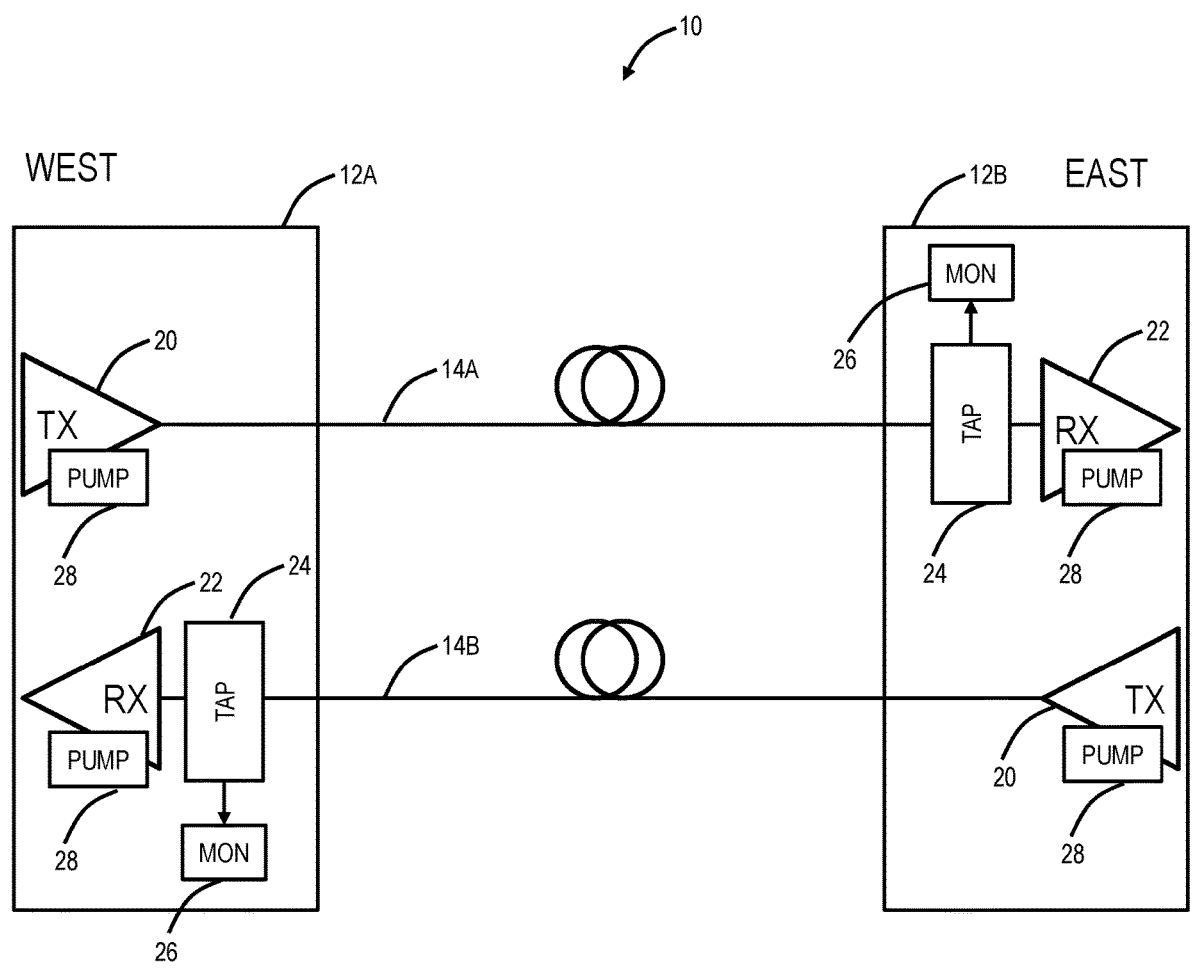
FIG. 1 is a network diagram of an optical system illustrating two network elements interconnected by optical fibers for bidirectional communication.

FIG. 1 is a network diagram of an optical system 10 illustrating two network elements 12A, 12B interconnected by optical fibers 14A, 14B for bidirectional communication. The network elements 12A, 12B can include various other components which are omitted for illustration purposes. The network elements 12A, 12B can include data equipment that is configured to transmit and receive signals over the optical fibers 14A, 14B. The network elements 12A, 12B each include a transmitting amplifier 20 (also referred to as a booster amplifier) that is connected to one of the optical fibers 14A, 14B for transmission and a receiving amplifier 22 that is connected to the other one of the optical fibers 14A, 14B for the reception. The network elements 12A, 12B also include a power tap 24 prior to the receiving amplifier 22. In some embodiments, the receiving amplifier 22 can be optional. The power tap 24 is configured to tap off a small portion of optical power for an optical monitor 26. The optical monitor 26 is a photodetector that is configured to provide inline monitoring. Of note, the optical system 10 enables bidirectional communication in that the network element and in this example, the network element 12A transmits to the network element 12B over the optical fiber 14A and the network element 12B transmits to the network element 12A over the optical fiber 14B. Also, there could be intermediate optical amplifiers and other components between the network elements 12A, 12B.

The optical amplifiers 20, 22 can be Erbium-Doped Fiber Amplifiers (EDFAs). EDFAs are well-known in the art relative to fiber optics. Generally, EDFAs include a core of silica fiber doped with trivalent erbium ions. The core can be efficiently pumped with a pump 28 laser at a wavelength of 980 nm or 1480 nm to exhibit gain in the 1550 nm region (C-band in fiber optics).

The signaling systems and methods include modulating the pump 28 current of an EDFA when there is no input power (i.e., no input signals) to generate an Amplified Stimulated Emission (ASE) based On-Off Keyed (OOK) signal at low bandwidth. For example, the network element 12A can cause modulation of the pump 28 of the transmitting amplifier 20 to send a signal to the network element 12B over the optical fiber 14A. At the far end, e.g., the network element 12B can receive the signal via the optical monitor 26. As described herein, the term "low bandwidth" is meant to signify a quantity of data sent between the transmitting amplifier 20 and the monitor 26. For example, in an eye safety application, the signal may convey one of several states (e.g., three states). In a connectivity application, the signal may convey a single unique identifier. That is, the low bandwidth signal is meant to convey state or identifier information when the optical amplifier 20 has no input.

Operating an EDFA as a signal generator is accomplished by controlling the pump 28 laser bias currents to achieve a target EDFA output power as a function of time. Signal generation independent of the transmitting EDFA's input requires either a means to isolate the input from the output (e.g., a blocking Variable Optical Attenuator (VOA), a dual-stage EDFA with the input stage unpumped—thus absorbing the input power—and pumped output stage, or fast pump control loops that stabilize the EDFA output even if the input was to change). The optical monitor 26 which detects the dark input condition or the pre-defined patterns originated by the upstream transmitting amplifier 20 can be implemented by tapping a portion of the incoming signal and terminating the tap on a photoreceiver. The receiver function can be consolidated with the conventional input power monitoring function performed at nodal inputs.

In an embodiment, the network element 12A includes the transmitting amplifier 20 configured to transmit to a first optical fiber 12A, wherein the transmitting amplifier has a pump 28 laser; an optional receiving amplifier 22 configured to receive from a second optical fiber 14B; an optical monitor 26 connected to the second optical fiber 14B and configured to detect a portion of optical power thereon; wherein the pump 28 laser is modulated to convey a signal to a second optical monitor in a second network element 12B connected to the first optical fiber 14A, when the transmitting amplifier 20 is one of in a safety mode and has no input. The optical monitor 26 can be configured to receive a second signal from a second transmitting amplifier 20 in the second network element 12B.

The signal includes Amplified Stimulated Emission (ASE) that is generated by modulating the pump 28 laser to change the output power of the transmitting amplifier 20 as a function of time. The transmitting amplifier 20 can be in the safety mode, and wherein an input to the transmitting amplifier 20 is blocked via a Variable Optical Attenuator, such that an output is based on the modulated pump 28 laser. The transmitting amplifier 20 is in the safety mode and is a multi-stage amplifier, and wherein an input to the transmitting amplifier 20 is blocked via no pumping of a first stage of the multi-stage amplifier, such that an output is based on the modulated pump 28 laser. The signal can be one of a plurality of patterns to indicate a state relative to amplifier shutdown due to eye safety. The signal can be a unique identifier used to verify connectivity. There can be no operational Optical Service Channel (OSC) on the first optical fiber and the second optical fiber.

Figure 2:
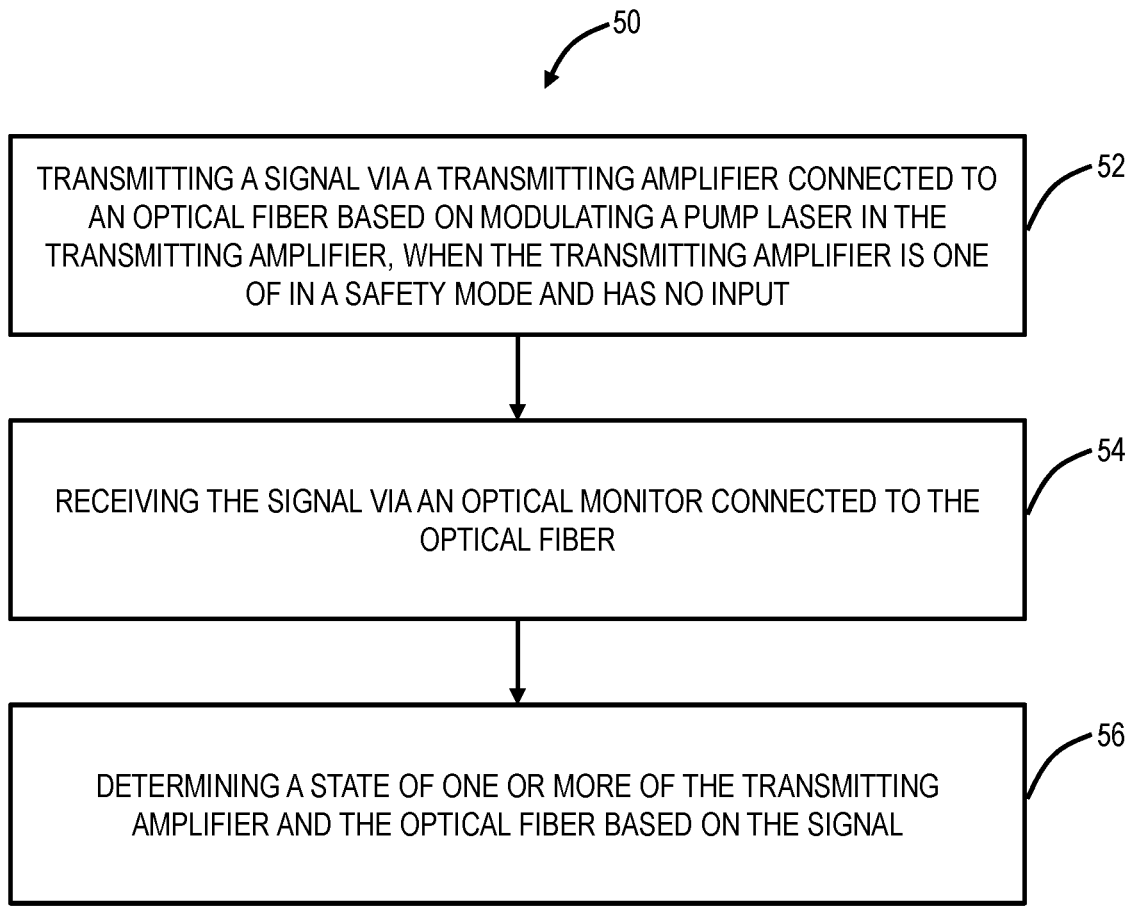
FIG. 2 is a flowchart of an optical amplifier signaling process.

FIG. 2 is a flowchart of an optical amplifier signaling process 50. The optical amplifier signaling process 50 includes transmitting a signal via a transmitting amplifier connected to an optical fiber based on modulating a pump laser in the transmitting amplifier, when the transmitting amplifier is one of in a safety mode and has no input (step 52); receiving the signal via an optical monitor connected to the optical fiber (step 54); and determining a state of one or more of the transmitting amplifier and the optical fiber based on the signal (step 56). The signal can include Amplified Stimulated Emission (ASE) that is generated by modulating the pump laser to change the output power of the corresponding transmitting amplifier as a function of time.

The transmitting amplifier can be in the safety mode, and wherein an input to the transmitting amplifier is blocked via one of a Variable Optical Attenuator and a switch, such that an output is based on the modulated pump laser. The transmitting amplifier can be in the safety mode and is a multi-stage amplifier, and wherein an input to the transmitting amplifier is blocked via no pumping of a first stage of the multi-stage amplifier, such that an output is based on the modulated pump laser. The signal can be one of a plurality of patterns to indicate the state relative to amplifier shutdown due to eye safety. The signal can be a unique identifier used to verify connectivity. There can be no operational Optical Service Channel (OSC) on the first optical fiber and the second optical fiber.

OSC Signaling for Shutoff Coordination

Figure 3:
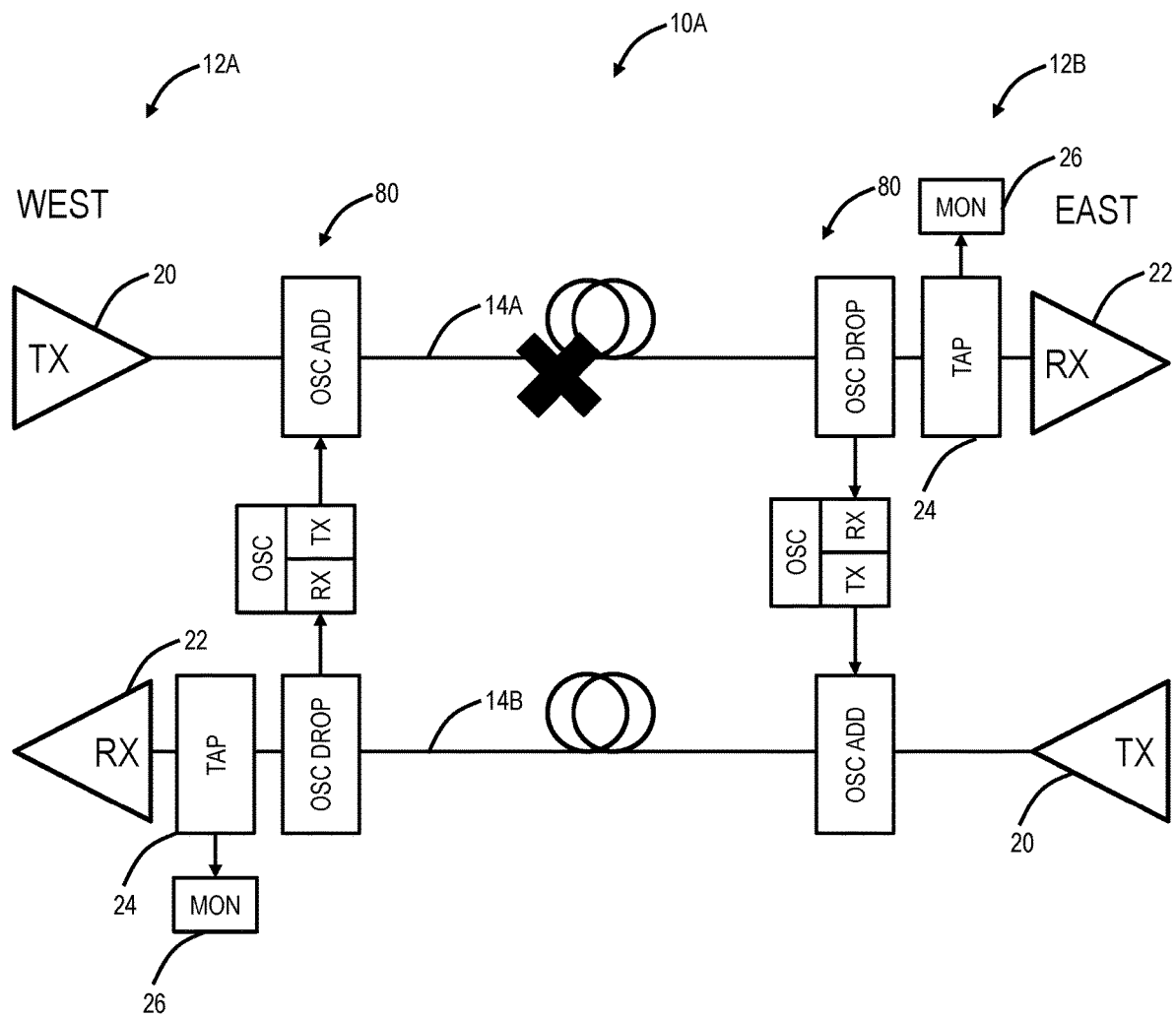
FIG. 3 is a network diagram of an optical system illustrating the use of an Optical Service Channel (OSC) to coordinate shutoff of the optical amplifiers for eye safety, etc.

FIG. 3 is a network diagram of an optical system 10A illustrating use of an OSC 80 to coordinate shutoff of the optical amplifiers 20, 22 for eye safety, etc. The objective of an eye safety control loop in the optical system 10A is to shutoff amplifiers 20, 22 when there is a fiber cut and to restore the amplifiers 20, 22 to normal operation following verification that the fiber is continuous. Continuity is determined by verifying signal continuity (a signal injected at one end emerges from the other end). Conventionally this is solved using an OSC 80 infrastructure (an out-of-band duplex communications channel used between adjacent network elements 12A, 12B).

The OSC 80 transmitter is eye safe (Class 1), and is always on. On its own, it does not pose an eye safety hazard to a person whose eye is exposed to a broken fiber. The OSC Tx is multiplexed with the transmitting amplifier's 20 output. At the downstream fiber termination point, the OSC is demultiplexed, and the OSC Rx detects OSC presence or absence. The OSC Rx state (Loss of Signal (LOS) or not) indicates forward path continuity between the upstream OSC Tx and downstream Rx. The detected OSC Rx state is signaled to the complementary OSC Tx. Conventionally, this can be accomplished by allocating a bit in the OSC framing structure for indicating forward path continuity. If the return path is continuous, the OSC Rx receives the detected state, and either releases or maintains the amplifier shutoff condition if the forward path is continuous or discontinuous, respectively. If the return path is not continuous, the OSC Rx does not receive the detected state, the continuity of the forward path is unknown to the OSC Rx, and the booster amplifier shutoff is maintained.

In summary, each booster amplifier 20 releases its amplifier shutoff condition when the forward path continuity indicator, received by the local OSC Rx, indicates continuity. The disadvantages of this approach for booster amplifier 20 restoration are that (1) an OSC is mandated and (2) the signaling scheme is embedded within the OSC communications protocol, which is not standardized. That is, the shortcomings of using the OSC to detect restoration of fiber continuity include, first, the OSC 80 becomes a required functionality if high-power optical amplifiers are to be used in a network, even if there is no separate requirement for an OSC (as in a multi-rail architecture, where an OSC 80 may not be present on all fiber pairs). Second, the OSC must have a communication path (either direct or indirect) to the transmitting amplifier in order to release the amplifier from a shutdown state. Such a communications path places a cost/functionality burden on both the OSC and amplifier, especially if these are to be functionally independent of each other (as in a disaggregated architecture).

Eye Safety Shutoff Coordination Via the Optical Amplifier Signaling Framework

Figure 4:
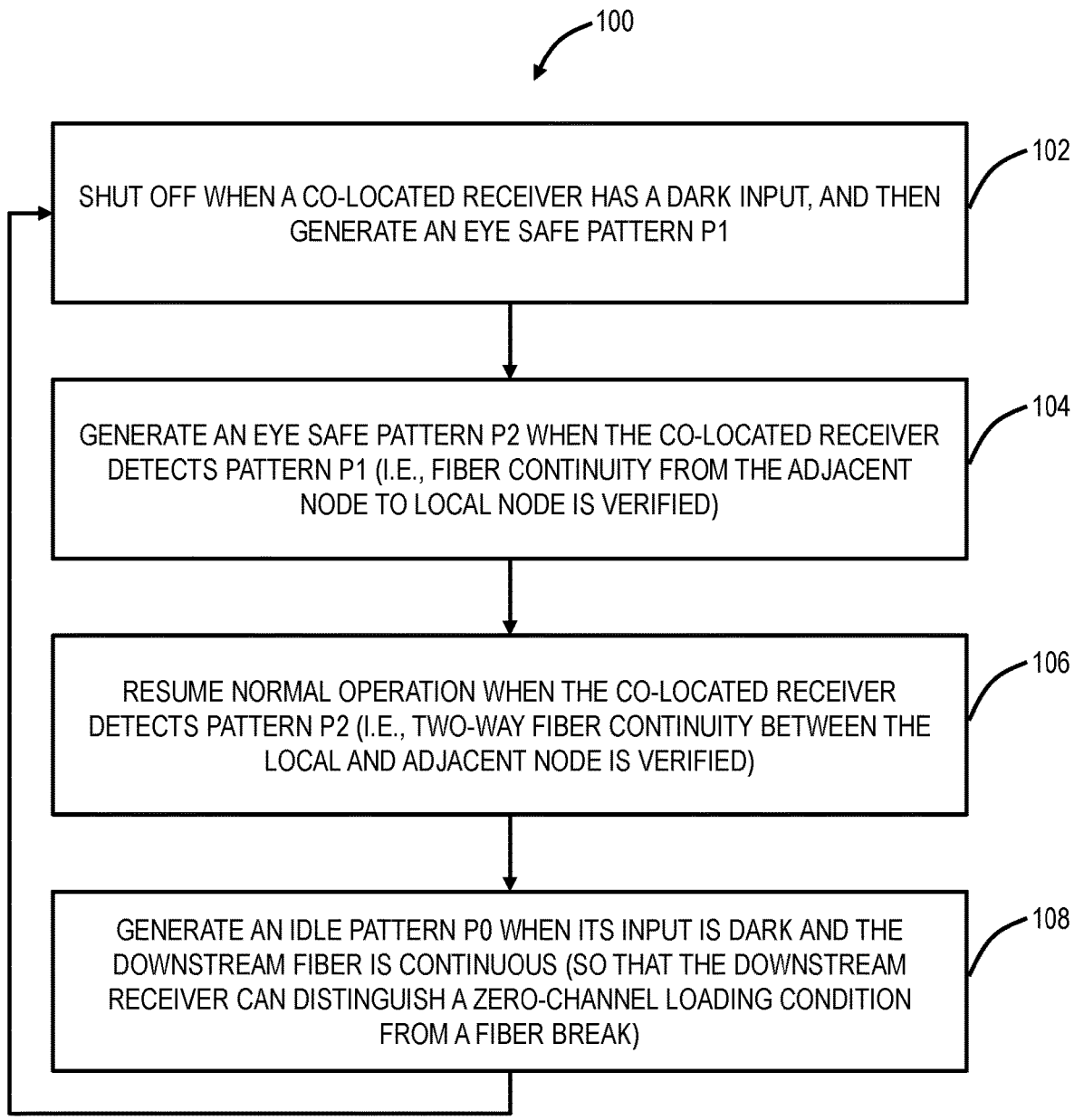
FIG. 4 is a flowchart of an eye safety shutoff coordination process.

In an embodiment, the optical amplifier signaling process 50 can be used to manage eye safety, to detect a fiber cut and subsequent fiber repair between two adjacent nodes without an OSC. FIG. 4 is a flowchart of an eye safety shutoff coordination process 100. The eye safety shutoff coordination process 100 can be implemented in the optical system 10 where there is the transmitting amplifier 20 and a receiver via the optical monitor 26 at each end of a duplex fiber link, the fibers 14A, 14B. The amplifiers 20, 22 can have at least three operational modes: normal, idle, and safety. Normal is where the amplifier 20, 22 has an input, is providing gain, and there is continuity. Idle occurs when there is an upstream break in continuity that results in a loss of input power to the transmitting amplifier 20, and safety is where the gain is reduced or turned off due to a break in continuity immediately downstream of the transmitting amplifier 20. A transmitting amplifier 20 that, when in a safety mode, can transmit distinct and predefined signal patterns, independent of its input signal, with signal levels below eye-safety limits. The optical monitor 26 is configured to monitor the fiber span's output and, when in a safety mode, is capable of detecting the various signal patterns generated by the upstream transmitting amplifier 20, as well as a dark input condition (i.e., no signal coming out of the fiber). Finally, there is a communication path between the co-located optical monitor 26 and the transmitting amplifier 20.

The eye safety shutoff coordination process 100 is described with reference to the booster amplifier 20 in a single network element 12A, but with the understanding the network element 12B is included and also transmitting/receiving. The objective of the eye safety shutoff coordination process 100 is for the equipment at one end of the fiber pair (co-located transmitting amplifier and receiver) to enter a safety mode when the receiver has a dark input condition. The equipment automatically leaves the safety mode once continuity on the associated fiber pair to the adjacent node has been verified.

The eye safety shutoff coordination process 100 provides a mechanism for automatically transitioning in and out of the safety mode, without the OSC. The booster amplifier 20 shuts off when its co-located receiver (optical monitor 26) has a dark input and then generates an eye-safe pattern P1 (step 102). The eye-safe pattern P1 is sent by the booster amplifier 20 by modulating its pump 28 as described herein. The booster amplifier 20 generates an eye-safe pattern P2 when its co-located receiver detects pattern P1 (i.e., fiber continuity from the adjacent network element 12B is verified) (step 104). The booster amplifier resumes normal operation when its co-located receiver detects pattern P2 (i.e., two-way fiber continuity between the local and adjacent node is verified) (step 106). Finally, the booster amplifier 20 generates an idle pattern P0 when its input is dark, and the downstream fiber is continuous (so that the downstream receiver can distinguish a zero-channel loading condition from a fiber break) (step 108). As described herein, the patterns P0, P1, P2 are the signal, and these can be any arbitrary pattern.

For the duration of a fiber cut, the network traffic is disrupted and the transmitter amplifiers 20 are an idle resource. The eye safety shutoff coordination process 100 takes advantage of the availability of the transmitter amplifier 20 and line input power monitor 26 that bookend each fiber 14A, 14B. When in the safety mode, the amplifier 20 is functionally repurposed as a transmitter, and the line input power monitor 26 is repurposed as a receiver. The transmitter amplifier 20 and input power monitor 26 communicate using a protocol such as in the eye safety shutoff coordination process 100, where the pattern detected by the receiver indicates the state of the fiber continuity between the two adjacent network elements 12A, 1B, relative to the receiver. That is, the signal is meant to continually transmit an associated mode, namely one of P0 (idle pattern indicating dark input but continuous fiber), P1 (indicating one-way fiber continuity), and P2 (indicating two-way fiber continuity). From these signals, it is possible to differentiate: 1) no signal received: inbound fiber is broken; 2) pattern P1 is received: inbound fiber is continuous, but outbound fiber is broken; and 3) pattern P2 is received: inbound and outbound fibers are continuous, and the amplifiers can automatically transition out of safe mode to normal mode. The transmitter amplifier 20 reverts to its customary functionality (as an amplifier) once it transitions to the normal mode.

Essential to this disclosure is a transmitting amplifier 20 capable of acting as an eye-safe signal generator with a time-varying output independent of the transmitter amplifier 20 input signal's presence or characteristics. The transmitting amplifier 20 is required to perform as a signal generator only when the transmitting amplifier 20 is in a safety mode.

Figure 5:
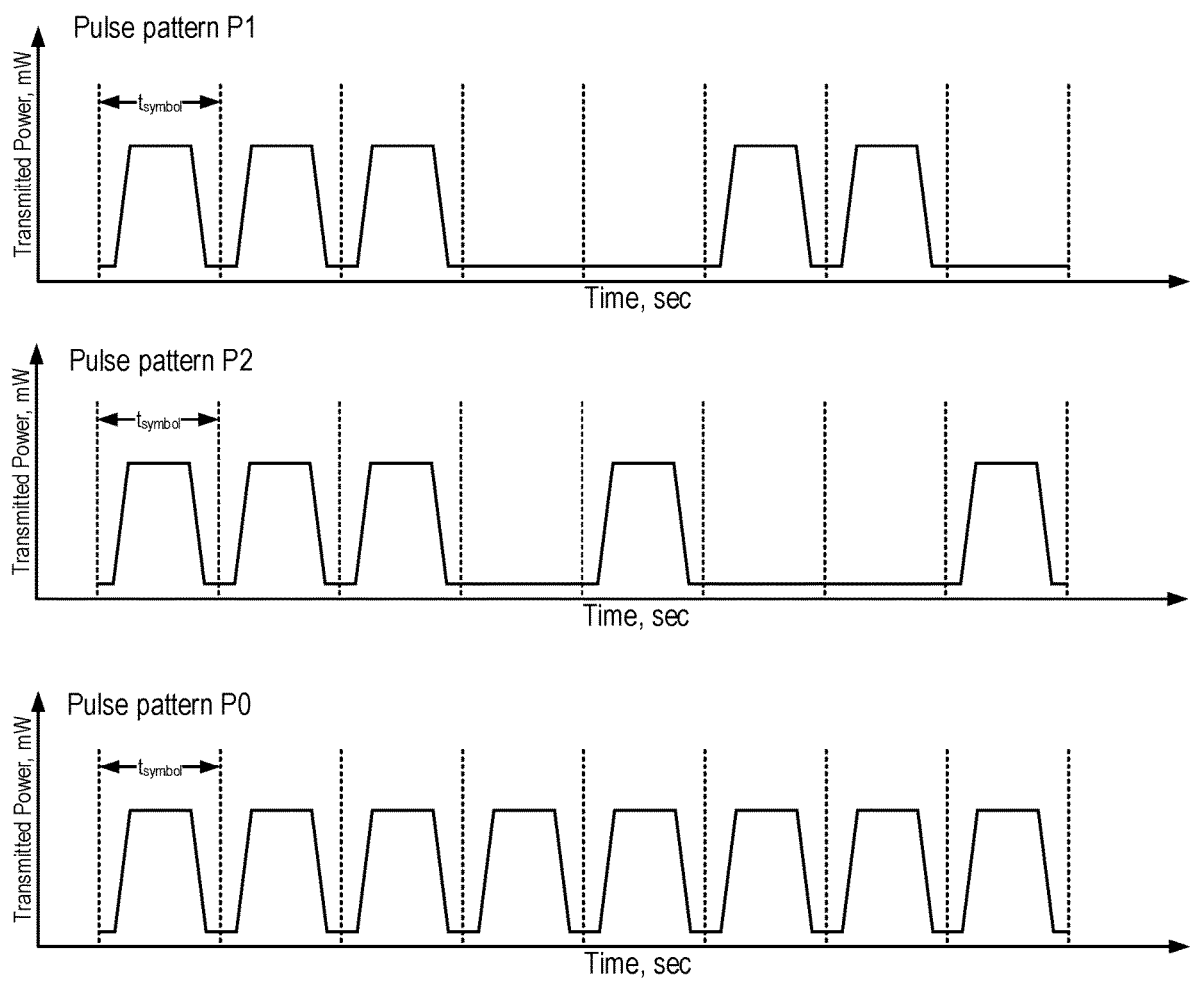
FIG. 5 is graphs of examples of transmitted pulse patterns P1, P2 and P0.

FIG. 5 is graphs of examples of transmitted pulse patterns P1, P2 and P0. Again, these transmitted pulse patterns are examples of the signal. The graphs illustrate power over time. Here, the transmitted pulse patterns are over eight time slots and the patterns are set to differentiate from one another. Those skilled in the art will recognize other patterns are also contemplated.

Eye Safety Example

Figure 6A:
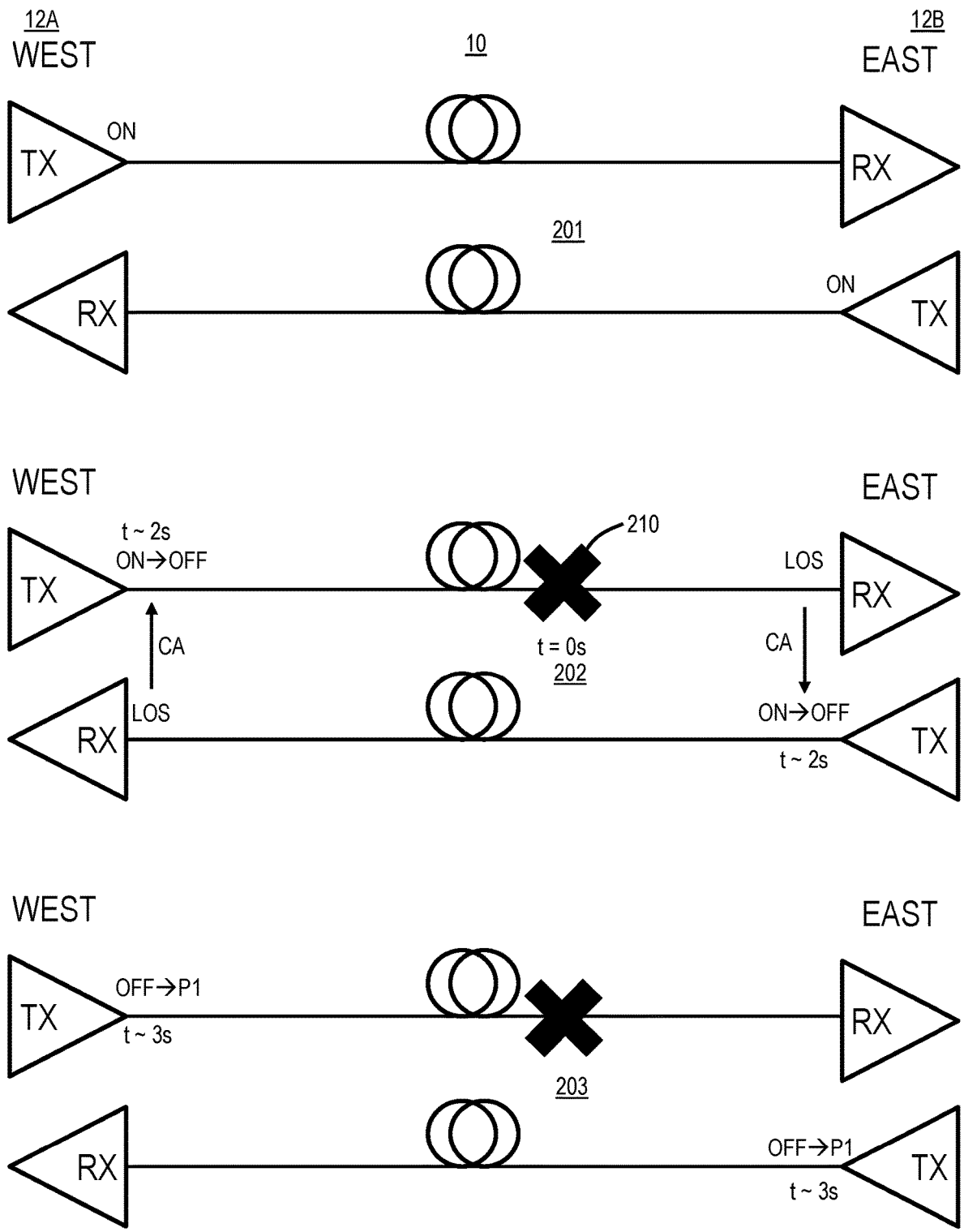
FIGS. 6A-6B are network diagrams of the optical system illustrating a sequence of fiber cut detection, transmitting amplifier safety operation, and recovery following fiber repair.
Figure 6B:
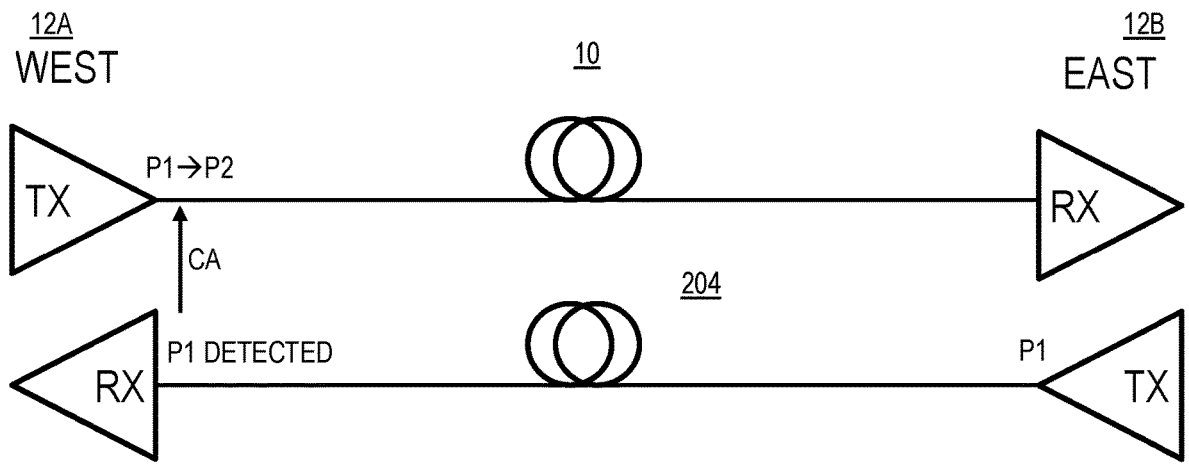
Figure 6B:
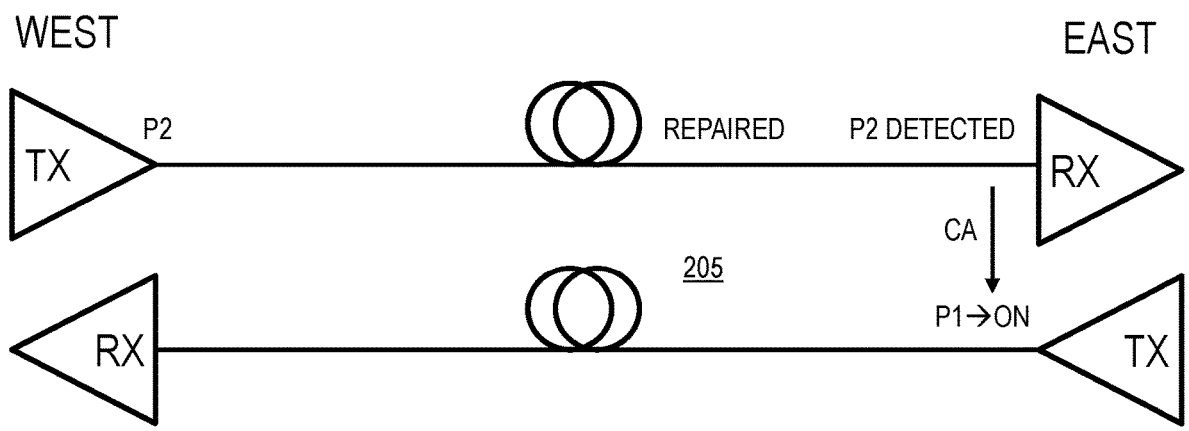
Figure 6B:
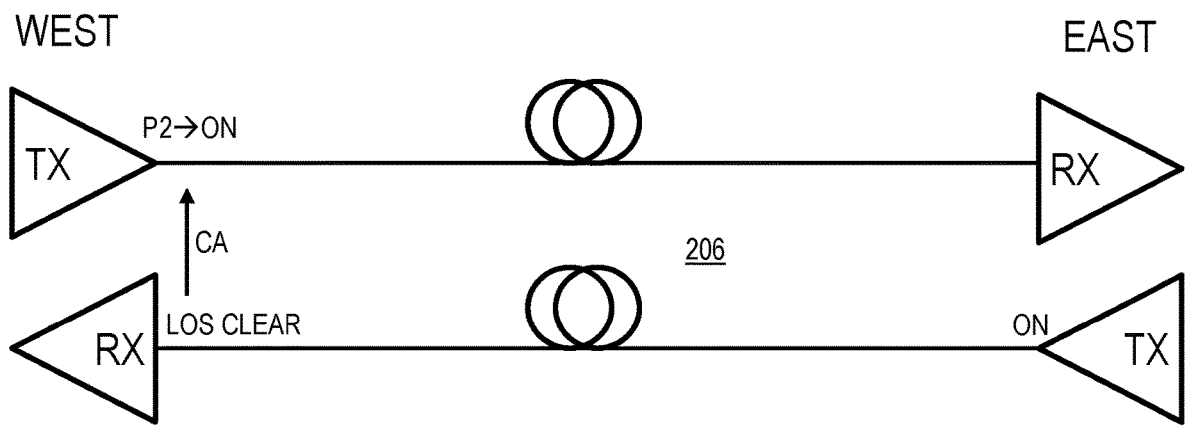

FIGS. 6A-6B are network diagrams of the optical system 10 illustrating a sequence of a fiber cut 200 detection, transmitting amplifier 20 safety operation, and recovery following fiber repair. At step 201, the optical system 10 is operational, no fiber cuts, such that both the transmitting amplifiers 20 are ON. At step 202, there is a fiber cut 210 affecting the optical fiber 14A, at a time t=0. At about 2 sec., the network element 12B detects Loss of Signal (LOS) and a Consequent Action (CA) is taken to turn the transmitting amplifier 20 at the network element 12B from ON to OFF. The network element 12A detects LOS, and a Consequent Action is taken to turn the transmitting amplifier 20 at the network element 12A from ON to OFF.

At step 203, both the transmitting amplifiers 22 at each network element 12A, 12B transition from the OFF state to a P1 state where the corresponding pump 28 lasers are modulated to send the pattern P1. At step 204, the network element 12A detects the P1 pattern on the optical fiber 14B, but the network element 12B does not detect the P1 pattern on the optical fiber 14A due to the fiber cut 210. The transmitting amplifier 20 in the network element 12A switches to the pattern P2 after detecting P1 from the network element 12B. At step 205, the fiber cut 210 is repaired, and the pattern P2 is detected by the network element 12B. A Consequent Action of transitioning the transmitting amplifier 20 at the network element 12B from P1 to ON is performed. Finally, at step 206, the network element 12A detects the LOS is clear, and a Consequent Action of transitioning the transmitting amplifier 20 at the network element 12A from P1 to ON is performed.

Multifiber Degree Optical System

Figure 7:
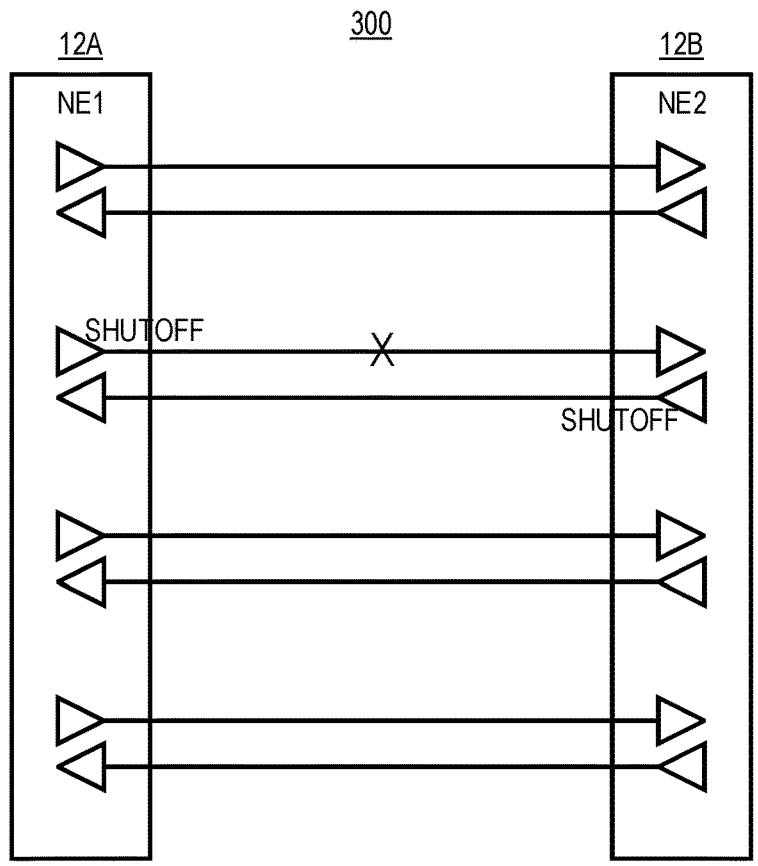
FIG. 7 is a network diagram of an example multifiber degree optical system.
Figure 7:
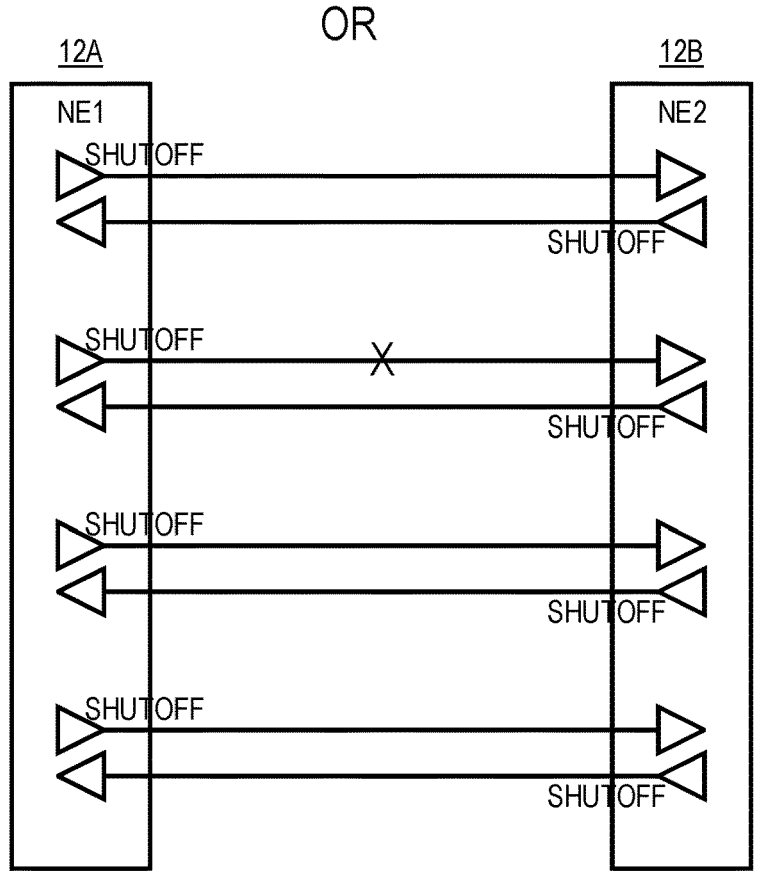

FIG. 7 is a network diagram of an example multifiber degree optical system 300. Conventionally, a degree in an OADM is synonymous with a single fiber pair. As networks grow, it is expected that optical systems will expand to have multiple fiber pairs between network elements 12A, 12B. The multifiber degree optical system 300 is shown with four fiber pairs between the network elements 12A, 12B. In this deployment, there is not necessarily a requirement to have an OSC on every fiber pair. When there is a fiber cut in the multifiber degree optical system 300, there is a need to determine which fiber is broken and which transmitting amplifiers 20 should be shut off. The present disclosure provides a solution to determining both these aspects.

OADM Node Connectivity

Figure 8:
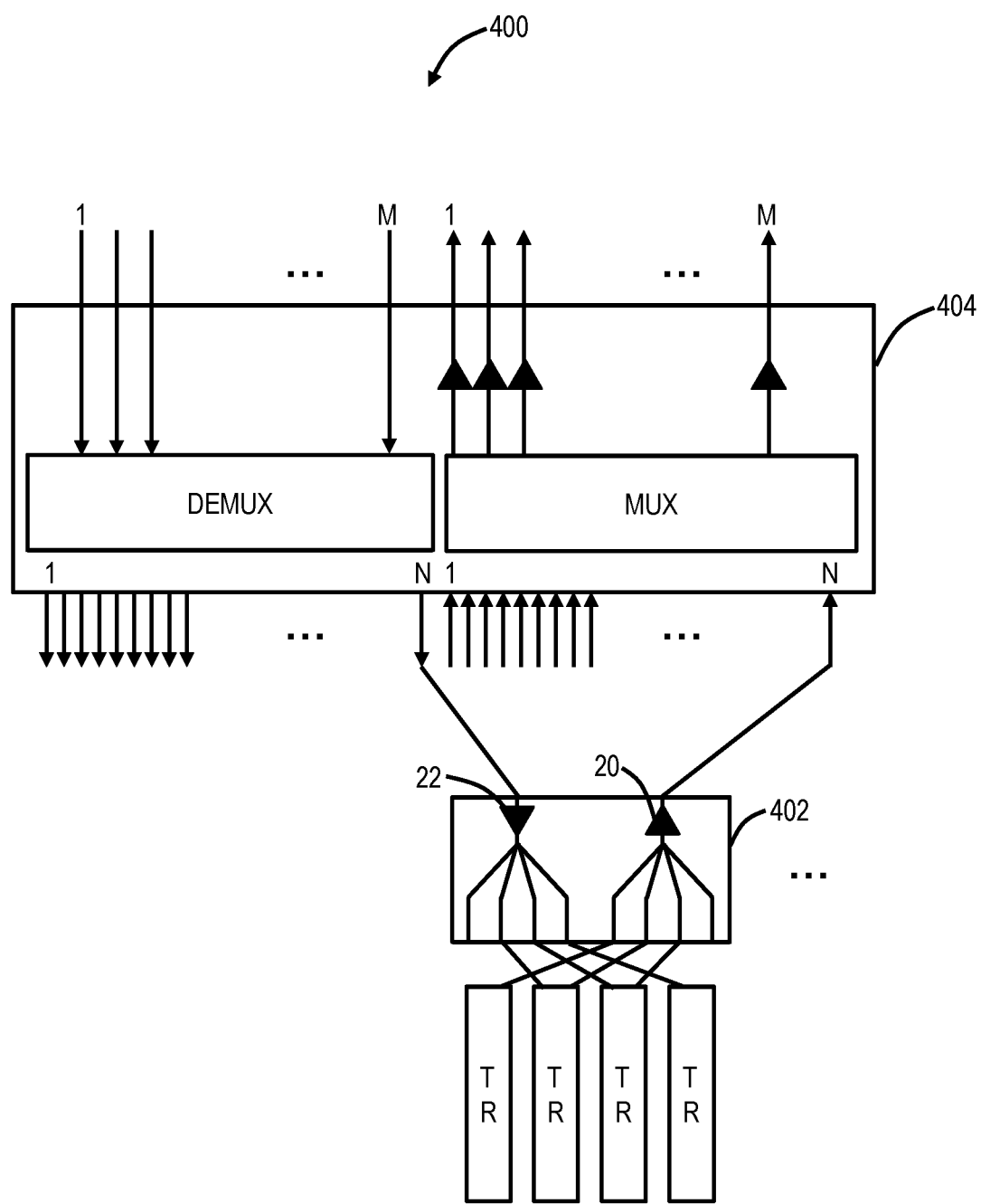
FIG. 8 is a block diagram of an Optical Add/Drop Multiplexer (OADM) node illustrating the use of the optical amplifier signaling process for connectivity.

FIG. 8 is a block diagram of an Optical Add/Drop Multiplexer (OADM) node 400 illustrating the use of the optical amplifier signaling process 50 for connectivity. For example, the OADM node 400 can be a CDC architecture having multiple modules 402, 404 interconnected to one another. For example, the module 402 can be a precombiner configured to aggregate transceivers and the module 404 can be a degree module with a Wavelength Selective Switch (WSS), etc. Of note, these next-generation modules 402, 404 include the amplifiers 20, 22 and the optical monitor 26. The optical amplifier signaling process 50 can be used to auto-detect connectivity.

The optical system 400 can include a transmitting amplifier 20 configured to transmit to an optical fiber, wherein the transmitting amplifier has a pump 28 laser; and an optical monitor 26 connected to the optical fiber and configured to detect a portion of optical power thereon; wherein the pump 28 laser is modulated to convey a signal to the optical monitor 26 connected to the optical fiber, when the transmitting amplifier 20 is one of in a safety mode and has no input. The optical fiber here can be a cable used to interconnect the modules 402, 404. The transmitting amplifier 20 can be in a first module 402 of an Optical Add/Drop Multiplexer (OADM), and the optical monitor can be in a second module 404 of the OADM. The signal can be a unique identifier used to verify connectivity. The unique identifier can identify one of a shelf, slot, and chassis.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A network element comprising:
a transmitting amplifier configured to transmit to a first optical fiber, wherein the transmitting amplifier has a pump laser; and
an optical monitor connected to a second optical fiber and configured to detect a portion of optical power thereon;
wherein the pump laser is modulated to convey a signal to a second optical monitor in a second network element connected to the first optical fiber, when the transmitting amplifier is one of in a safety mode and has no input, and
wherein the transmitting amplifier is in the safety mode, and wherein an input to the transmitting amplifier is blocked via one of a Variable Optical Attenuator and a switch, such that an output is based on the modulated pump laser.

2. The network element of claim 1, wherein the optical monitor is configured to receive a second signal from a second transmitting amplifier in the second network element.

3. The network element of claim 1, wherein the signal includes Amplified Stimulated Emission (ASE) that is generated by modulating the pump laser to change output power of the transmitting amplifier as a function of time.

4. The network element of claim 1, wherein the signal is one of a plurality of patterns to indicate a state relative to amplifier shutdown due to eye safety.

5. The network element of claim 1, wherein the signal is a unique identifier used to verify connectivity.

6. The network element of claim 1, wherein there is no operational Optical Service Channel (OSC) on the first optical fiber and the second optical fiber.

7. An optical system comprising:
a transmitting amplifier configured to transmit to an optical fiber, wherein the transmitting amplifier has a pump laser; and
an optical monitor connected to the optical fiber and configured to detect a portion of optical power thereon;
wherein the pump laser is modulated to convey a signal to the optical monitor connected to the optical fiber, when the transmitting amplifier is one of in a safety mode and has no input, and wherein the signal is a unique identifier used to verify connectivity.

8. The optical system of claim 7, wherein the signal includes Amplified Stimulated Emission (ASE) that is generated by modulating the pump laser to change output power of the transmitting amplifier as a function of time.

9. The optical system of claim 7, wherein the transmitting amplifier is in a first module of an Optical Add/Drop Multiplexer (OADM) and the optical monitor is in a second module of the OADM.

10. The optical system of claim 7, wherein the unique identifier identifies one of a shelf, slot, and chassis.

11. A network element comprising:
a transmitting amplifier configured to transmit to a first optical fiber, wherein the transmitting amplifier has a pump laser; and
an optical monitor connected to a second optical fiber and configured to detect a portion of optical power thereon;
wherein the pump laser is modulated to convey a signal to a second optical monitor in a second network element connected to the first optical fiber, when the transmitting amplifier is one of in a safety mode and has no input, and
wherein the transmitting amplifier is in the safety mode and is a multi-stage amplifier, and wherein an input to the transmitting amplifier is blocked via no pumping of a first stage of the multi-stage amplifier, such that an output is based on the modulated pump laser.

12. The network element of claim 11, wherein the optical monitor is configured to receive a second signal from a second transmitting amplifier in the second network element.

13. The network element of claim 11, wherein the signal includes Amplified Stimulated Emission (ASE) that is generated by modulating the pump laser to change output power of the transmitting amplifier as a function of time.

14. The network element of claim 11, wherein the signal is one of a plurality of patterns to indicate a state relative to amplifier shutdown due to eye safety.

15. The network element of claim 11, wherein the signal is a unique identifier used to verify connectivity.

16. The network element of claim 11, wherein there is no operational Optical Service Channel (OSC) on the first optical fiber and the second optical fiber.

\* \* \* \* \*